INVENTORS
JOHN J. KANE
ALLEN P. MATTER

BY Eugene G. ~~~

ATTORNEY

Nov. 29, 1966         J. J. KANE ET AL         3,287,925
INTRANSIT LIQUEFIED GAS REFRIGERATION SYSTEM
Filed Dec. 5, 1963                             2 Sheets-Sheet 2

INVENTORS
JOHN J. KANE
ALLEN P. MATTER
BY Eugene G. Treutler
ATTORNEY

United States Patent Office 3,287,925
Patented Nov. 29, 1966

3,287,925
INTRANSIT LIQUEFIED GAS REFRIGERATION SYSTEM
John J. Kane, Fullerton, Calif., and Allen P. Matter, Kenmore, N.Y., assignors to Union Carbide Corporation, a corporation of New York
Filed Dec. 5, 1963, Ser. No. 328,356
13 Claims. (Cl. 62—51)

This application is a continuation-in-part of application Serial No. 96,294, filed March 16, 1961 and now abandoned.

This invention relates to a method and apparatus for the refrigeration of perishable food products and, more specifically, to a mobile, liquefied-gas, refrigeration system.

Preservation of perishable food products, by maintaining the temperature of such food products at an acceptable level while transporting them from the initial point of processing to retail food outlets has been, heretofore, an inefficient and hence a prohibitively costly procedure. The results have been that the increased costs associated with inefficient preservation processes are passed on to the consumer of food products and, worse yet, the likelihood of the consumer receiving a sub-standard product is increased.

Perishable food products are commonly preserved by freezing, which is generally confined to the main producing areas wherefrom the processed food products are transported to central warehouses for subsequent redistribution to local retail outlets. The difficulties of maintaining the frozen food products at an acceptable temperature level are greatest during their delivery to local retail outlets, but are also present during the transporting of these food products from the producing areas to the central warehouses. It is generally believed by health authorities that a suitable temperature level at which intransit frozen food products should be maintained is about 0° F. However, because of many factors, not the least of which was the prior art's difficulty in economically maintaining such a low temperature level, these authorities usually set a temperature level of about +10° F. as the absolute upper limit. Even at this temperature level, the prior art has been hard pressed to efficiently refrigerate the frozen food products.

Delivery of frozen food products in a satisfactory condition from the central warehouses to the local retail outlets is complicated by the method of "open-door" operation. Ordinarily several local delivery stops are made by the deliverer, each stop involving the opening of the vehicle storage chamber in order to remove a portion of the food products. For all practical purposes, the refrigerated atmosphere within the storage chamber is lost at each stop, and thus a refrigeration system is required that is capable of recooling the storage chamber atmosphere before the temperature of the remaining frozen food products has a chance to rise above the permissible limit.

Of course the "closed-door" operation of transporting the frozen food products from the main producing areas to the centrally-located warehouses is not hampered by the problems involved with the loss of the refrigerated, storage chamber atmosphere. Usually the storage chamber is opened only when the food products are removed. Closed-door operation is instead plagued by a problem exemplified by the prior art's employment of solid refrigerants such as solid $CO_2$.

The direct contact between the solid refrigerant and the stored food products creates the likelihood that the probable condensation of the water vapor of the refrigerated storage chamber atmosphere will freeze around the solid refrigerant whereby forming a sheet of ice. This sheet of ice tends to partially insulate the solid refrigerant from the refrigerated storage chamber atmosphere with the result that the effectiveness of the refrigeration system is markedly decreased.

Prior art methods of employing $CO_2$ as a direct-contact refrigerant have met with little success insofar as an economical and efficient refrigeration is concerned. This is especially true for the open-door type of operation inasmuch as the $CO_2$ systems are generally unable to prevent a 15–20° F. food product temperature increase during a normal 8-hour day's deliveries. This large and, practically speaking, unavoidable warm-up necessitates a substantial degree of sub-cooling of the food products prior to loading them into the delivery vehicle.

It is, therefore, an object of this invention to provide a refrigeration system that will reduce the storage chamber atmospheric temperature to any desired level below ambient, consistant with the inherent properties of the refrigerant employed. Another object is to provide a refrigeration system that is capable of rapidly cooling the atmosphere of the storage chamber thereby preventing an appreciable rise in temperature of the stored food products during an "open-door" delivery operation. It is a further object of this invention to provide a refrigeration system that is characterized by rugged simplicity that markedly reduces intransit breakdowns thereby minimizing spoilage of the food products.

Other objects, features, and advantages of the present invention will be apparent from the following detailed descriptions of the preferred embodiments thereof taken in conjunction with the accompanying drawings, in which.

Although the invention will be described in terms of a system for preserving previously frozen or sub-cooled perishable food products in an atmosphere held within a predetermined temperature range while in transit, it is to be understood that the invention may also be employed in the intransit cooling or freezing of perishable food products.

According to the invention the perishable food products to be transported in a frozen or sub-cooled state are placed within a mobile storage chamber and closed-off from the ambient atmosphere. A low-boiling liquefied gas refrigerant stored within a relatively heat impervious, insulated storage vessel, is sprayed over the perishable food products thereby lowering the temperature of the storage chamber atmosphere from ambient temperature into a predetermined range as monitored by a temperature sensing element suitably positioned within the storage chamber for that purpose. Whenever the temperature of the storage chamber atmosphere rises above this range, the temperature sensing element actuates the refrigerant distributing system and the stored food products are sprayed with the refrigerant for a period of time necessary to lower the temperature of the storage chamber atmosphere to within the predetermined range.

Considering the "open-door" type of operation, upon removal of a portion of the food products from within the storage chamber, of necessity, the atmosphere within the storage chamber will be exposed to the effects of ambient temperature, and the temperature of such atmosphere will rapidly rise above the predetermined range and approach the ambient temperature. Longer food product removal periods will result in higher storage chamber atmospheric temperatures during the removal operation.

To counteract the actuation of the refrigerant distributing system during food product removal, when the temperature of the storage chamber atmosphere rises above this range, an overriding mechanism disconnects the refrigerant distributing system whenever the storage chamber is opened and exposed to ambient atmosphere. Consequently, the refrigerant is prevented from leaving the insulated storage vessel. This feature of the invention not only conserves the refrigerant but also protects those who load and unload the food products against exposure to an atmosphere deficient in oxygen.

Should a person in the storage chamber accidentally close off the storage chamber from the ambient atmosphere thus causing the temperature sensing element to actuate the refrigerant distributing system, a preferred embodiment of the invention provides an emergency shut-off mechanism located within the storage chamber that, upon activation, will disconnect the distributing system thereby preventing any flow of the refrigerant from the insulated storage vessel.

In the event that the automatic distributing system fails to operate, an emergency by-pass system may be manually operated to spray the refrigerant into the storage chamber.

Figure 1:
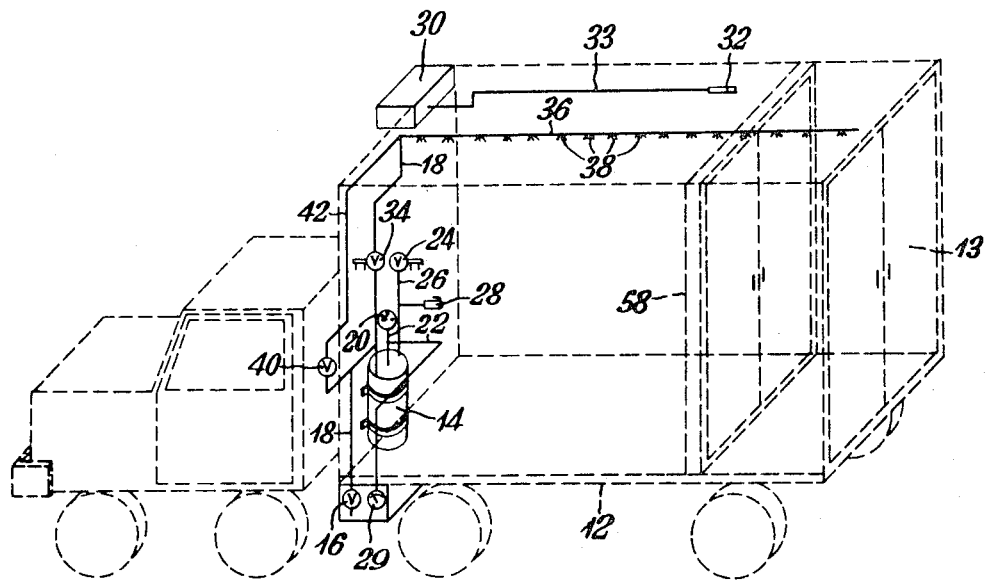
FIGURES 1 and 4 are three-dimensional diagrams of the present invention.

A preferred embodiment as shown in FIG. 1 includes a refrigerated mobile delivery vehicle 10 having a storage chamber 12 mounted thereon. The storage chamber 12 may be of standard construction for typical mobile refrigerated storage chamber, e.g.—reinforced aluminum siding outer walls, plywood panelled inner walls, and asbestos insulating material between the two walls. Refrigerant economy is increased with a decrease in the thermal conductivity of the storage chamber walls. For good refrigerant economy the thermal conductivity of walls should be less than 0.03 B.t.u./hr.-° F.-ft. For optimum operating conditions the storage chamber should be essentially air tight with the doors in a locked position, however, tests have shown that standard mobile insulated storage chambers are not completely air tight. While this decreases the operating efficiency to a certain extent, the decrease has been found to be not nearly as severe for this invention as with mobile mechanical and $CO_2$ refrigeration units.

As shown in FIG. 1, a low-boiling liquefied gas refrigerant storage container 14 is located within storage chamber 12 and attached by conventional means to a wall thereof. Container 14 is so depicted only for illustrative purposes since it may just as conveniently be placed exterior to the storage chamber. Container 14 comprises an outer shell that completely surrounds an inner storage vessel, thereby forming an evacuable insulation space between the outer shell and the inner storage vessel. For efficient utilization of the stored refrigerant (to be explained later), an insulation that will limit the heat leak such that it will not exceed 0.0002 B.t.u./hr.-° F.-lb. of water capacity should be placed within the insulation space. An opacified insulation having a thermal conductivity less than about 0.0006 B.t.u./hr.-° F.-ft. and preferably less than about 0.0002 B.t.u./hr.-° F.-ft. is specially suitable for employment therein.

The term "opacified insulation" as used herein refers to a two-component insulating system comprising a low heat conductive, radiation permeable material and a radiant heat impervious material which is capable of reducing the passage of infrared radiation rays without significantly increasing the thermal conductivity of the insulating system. The term "vacuum" as used herein is intended to refer to the vacuum pressure in the aforementioned evacuable insulation space. The term applies to sub-atmospheric pressure conditions not substantially greater than 1,000 microns of mercury, and preferably less than 100 microns of mercury absolute.

The opacified insulation may take the form of a low heat conductive material and a multiplicity of spaced radiation-impervious barriers. As more fully described and claimed in copending U.S. Serial No. 597,947, filed July 16, 1956, in the name of L. C. Matsch and now U.S.P. 3,007,596, the low heat conductive material may be a fiber insulation which may be produced in sheet form. Examples include a filamentary glass material such as glass wool and fiber glass, preferably having fiber diameters less than about 50 microns. Also such fibrous materials preferably have a fiber orientation substantially perpendicular to the direction of heat flow across the insulation space. The spaced radiation-imprevious barriers may comprise either a metal, metal oxide, or metal coated material, such as aluminum coated plastic film or other radiation reflective or radiation adsorptive material or a suitable combination thereof. Radiation reflective materials comprising thin metal foils are particularly suited in the practice of the present invention, for example, reflective sheets of aluminum foil having a thickness between 0.2 mm. and 0.002 mm. When fiber sheets are employed as the low-conductive material, they may additionally serve as a support means for the relatively fragile impervious sheets. For example, an aluminum foil-fiber sheet insulation may be spirally wrapped around the inner storage vessel with one end of the insulation wrapping in contact with the inner vessel, and the other end nearest the outer shell or in actual contact therewith.

It will be appreciated that other forms of opacified insulation may be used. For example, the radiation impervious barrier may be incorporated directly into the low heat conductive material with a resultant mixture of finely divided low conductive particles and radiant heat impervious bodies having a relatively high thermal conductivity. Such an insulation system, as described more fully and claimed in U.S. Patent No. 2,967,152, issued in the name of L. C. Matsch, may comprise a 50%–50% by weight mixture of finely divided silica powder having particles sizes below about 75 microns, and copper flakes smaller than about 50 microns with a flake thickness less than about 0.5 micron. While the aforementioned opacified insulation mixture gives best results, it has been found that mixtures having larger-sized particles also give excellent results.

Even though the previously described preferred opacified insulation is more effective than straight vacuum insulation at higher internal pressures (poorer vacuum), its effective thermal insulation life is extended if the pressure can be maintained at or below a desired level. A gas removing material such as an adsorbent may be used in the insulation space to remove by adsorpton any gas entering through the joints of the refrigerant transfer conduit. In particular, crystalline zeolitic molecular sieves having pores of at least about 5 angstrom units in size, as disclosed in U.S. Patent No. 2,900,800 to P. E. Loveday, are preferred as the adsorbent since they have extremely high adsorptive capacity at the temperature and pressure conditions existing in the insulation space and are chemically inert toward any gases which might leak into the insulating jacket.

Low-boiling liquefied gases which are suitable for employment as refrigerants in the present invention are those which have a boiling point at atmospheric pressure below about −80° C. Examples of such liquefied gases are liquid air, liquid argon, liquid helium, and liquid nitrogen. Liquid nitrogen is preferred because of its inertness and relative ease of separation from air. While the subsequent discussion refers specifically to nitrogen, it is to be understood that all of the aforementioned gases are also suitable.

The storage vessel within storage container 14 is filled with liquefied nitrogen by connecting a source of liquefied nitrogen stored at above atmospheric pressure to filling valve 16 and opening valve 16 thereby allowing the transfer of liquefied nitrogen from a storage tank through conduit 18 into container 14. If the liquid nitrogen is stored at a pressure below the operating pressure of container 14, the transfer conduit 18 from the liquid source would be connected to a suitable pump and, usually, additional heat would be added to the pressurized liquid before transferring it into container 14.

A trycock and vent system, extending into the inner storage vessel of container 14 is opened prior to the start of the filling operation and is employed to indicate when container 14 is full. When container 14 is full, valve 16 and the trycock and vent system are simultaneously closed. The latter must be closed immediately upon cessation of the filling operation in order that the vapor pressure within container 14 does not fall below the initial operating pressure. Because there is no appreciable amount of heat inleak to the inner storage vessel of container 14, due to the high quality of the opacified insulation, the stored liquid nitrogen can only be dispensed by the vapor pressure created at the time of filling; that is, the pressure at which the liquid and its vapor are in equilibrium at the temperature of the liquid. Thus any leakage through the trycock and vent system caused by not closing it quickly enough will result in a vapor pressure, within container 14, below the initial operating pressure and, hence, the complete utilization of the refrigerating effects of the stored liquefied nitrogen will not be accomplished.

It has been found that at operating pressures below about 10 p.s.i.g. the rate of liquid nitrogen withdrawal from container 14 markedly decreases, thereby resulting in a much increased time period necessary to cool down storage chamber 12. With operating pressures below 10 p.s.i.g., it is conceivable that (with "open-door" operation) the storage chamber atmosphere would not have been cooled to within the predetermined temperature range, because of exposure to ambient temperature at the last delivery stop, by the time the next delivery point has been reached. This effect is clearly cumulative and it is possible that the temperature of the storage chamber atmosphere, instead of being maintained at a predetermined level of 0° F. or 10° F., would be kept at a tempearture of about 15° F. to 20° F. This is certainly not a desirable effect.

Insofar as an upper pressure limit is concerned, it has been found that at pressures above about 100 p.s.i.g. the inherent lag characteristics of presently known temperature sensing elements will not permit suitable control of the liquid nitrogen withdrawal. Before a temperature-dependent control system can be activated to terminate the withdrawal of liquid nitrogen under pressures above about 100 p.s.i.g. the temperature of the storage chamber atmosphere would probably drop to about −50° F. or lower. Such low temperatures are ordinarily not required and, hence, the establishment of such temperatures results in a waste of the liquid nitrogen refrigerating effects. For these reasons, the preferred operating pressure range of this mobile refrigration system is between about 10 p.s.i.g. and 100 p.s.i.g.

During the filling operation, the vapor pressure is likely to exceed the initial operating pressure. If this occurs, pressure sensitive switch 20, which communicates with the vapor space within container 14 by conduit 22, will activate vapor phase solenoid valve 24 thereby allowing excess vapor to escape from within container 12 through conduit 26 into storage chamber 12. Under normal operating conditions, once the filling operation is completed, the vapor pressure within container 14 will not exceed the initial operating pressure since the heat leak through the aforementioned insulation that would cause this pressure build-up is negligible. However, if the pressure does build up excessively beyond the initial operating pressure, suitable pressure relief means are provided, which are generally indicated at 28, to allow the excess vapor to escape if valve 24 is unable to relieve the pressure quickly enough. Pressure gauge 29 is connected to conduit 22 thereby visually indicating the operating pressure within container 14.

In addition to being a liquid nitrogen filling conduit, conduit 18 also dispenses liquid nitrogen into storage chamber 12. When the temperature of the storage chamber atmosphere rises above a predetermined level—e.g., 0° F.—a temperature controller 30, attached to a temperature sensing element 32 by conduit 33, activates liquid phase solenoid valve 34 thereby allowing liquid nitrogen to be dispensed through conduit 18 and into conduit 36 which contains a plurality of perforations 38. Perforations 38 are preferably alternately spaced about 1 ft. apart on either side of the longitudinal axis of conduit 36 and directed at an angle of about 30°–60° from the vertical downward axis. It has been found that this orientation of perforations 38 minimizes the creation of undesirable thermal gradients throughout storage chamber 12. Furthermore, such an orientation minimizes the direct impingement of the liquefied nitrogen on the storage chamber ceiling and walls. Direct impingement markedly increases the consumption of the refrigerant due to direct conduction of heat from the chamber walls and ceiling to thhe refrigerant and is therefore highly undesirable. The preferred embodiment of conduit 36 extends the longitudinal length of storage chamber 12 but may be modified as described hereinafter.

As will be explained later, the operation of this system may be electrically or pneumatically controlled and should there be a failure in the electrical or pneumatic network, provisions for manually directing liquid nitrogen into storage chamber 12 have been afforded. Emergency by-pass valve 40 can be manually opened thus allowing liquid nitrogen to flow through conduit 18 into branch conduit 42 and into perforated conduit 36.

When access is gained to storage chamber 12 by access means 13, ambient temperature air will rapidly diffuse throughout storage chamber 12 thereby displacing the cold chamber atmosphere and raising the temperature of the storage chamber atmosphere. To prevent temperature controller 30 from opening valve 34 under these circumstances an overriding mechanism, switch 44 (see FIG. 2), opens and disconnects the temperature controller circuit. Because this refrigeration system is capable of rapid and economical cooling of the temperature of the storage chamber atmosphere from ambient temperature down to any desired low temperature commensurate with the properties of liquid nitrogen, e.g. 0° F., it is satisfactory to temporarily inactivate the system during the exposure of the chamber's interior to the ambient atmosphere. Emergency switch 46 is provided in an accessible position within storage chamber 12 so that the temperature controller circuit can be disconnected from inside the chamber should the need arise—i.e., in the event that someone is locked in.

Figure 2:
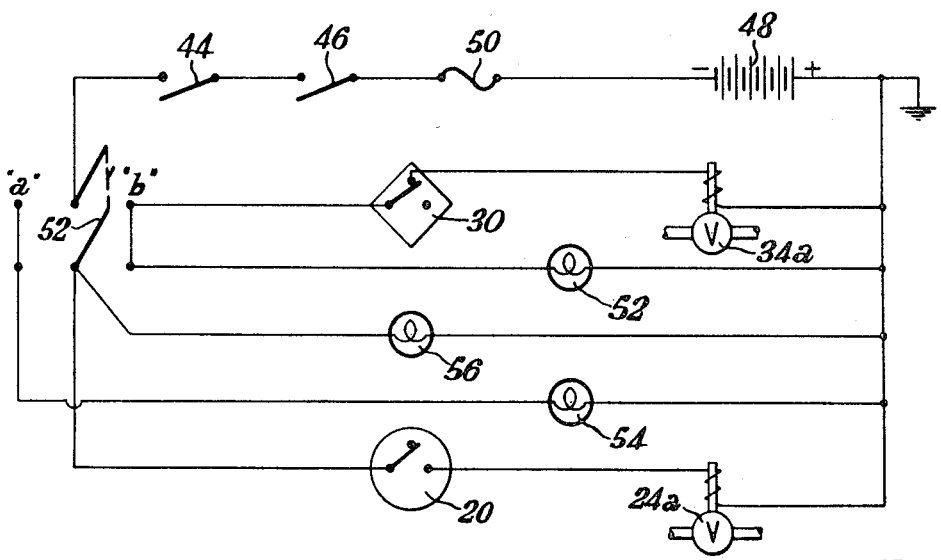
FIGURE 2 is a schematic diagram of a suitable electrical circuit for operating the system of FIGURE 1.

FIG. 2 shows an electrical circuit diagram for a liquid nitrogen refrigerated vehicle and is connected to the vehicle battery 48 and fuse 50. Double pole-double throw switch 52 is shown in the off position. During the filling of container 14, switch 52 is thrown to position "a" thereby connecting in parallel pressure sensitive switch 20 which is in series with vapor phase solenoid 24a, and a fill pilot light 54, and emergency switch location light 56. It is to be noted that switches 44 and 46 must be closed before filling container 14, otherwise vapor phase valve 24 will be inoperative. This is a precautionary feature to protect those operating the refrigeration system from physically contacting cold nitrogen vapor and an oxygen deficient atmosphere. When the system is to be operated, switch 52 is thrown to position "b" thereby connecting in parallel pressure switch 20 which is in series with solenoid 24a, locator light 56, a "run" pilot light 52, and temperature controller 30 which is in series with liquid phase solenoid 34a. Again it is to be noted that switches 44 and 46 must be closed for liquid nitrogen to be dispensed.

Figure 3:
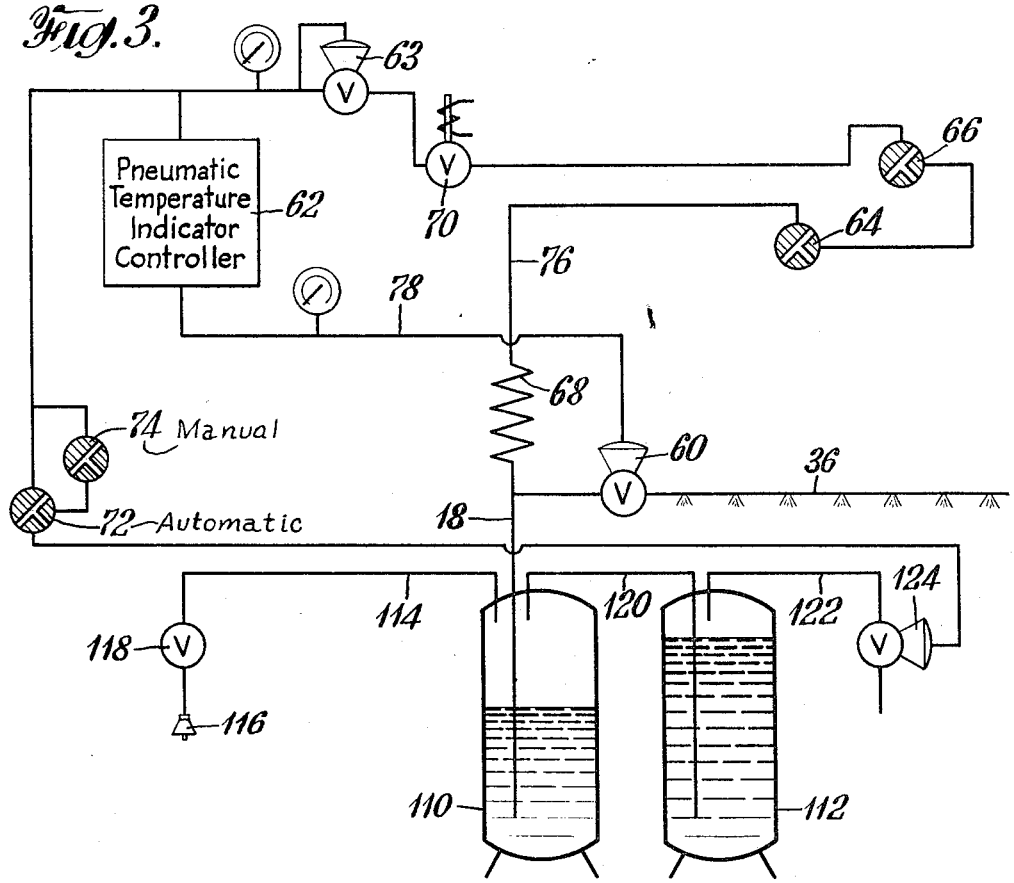
FIGURE 3 is a schematic diagram of a suitable pneumatic circuit for operating the system of FIGURE 1 and is a schematic diagram of a liquid storage container arrangement.

FIG. 3 shows a pneumatic circuit diagram for a liquid nitrogen refrigerated vehicle which operates independently of the vehicle power source. This circuit comprises a pneumatically-operated liquid valve 60 in the liquid withdrawal line 18, a pneumatic temperature indicator-controller 62, a pressure regulator 63, a door-actuated three-way shut-off valve 64 and an emergency three-way shut-off valve 66 located within the storage chamber, a vaporizer 68, an on-off solenoid switch valve 70, an automatic liquid storage container pressure vent three-way valve 72, and a manual liquid storage container pressure vent three-way valve 74. The pneumatic control circuit operates as follows:

(1) Liquid nitrogen is taken upstream of the pneumatic valve 60 through conduit 76 and vaporized in vaporizer 68, which may be a finned tube, where the nitrogen is vaporized and superheated to about the temperature of the storage chamber.

(2) From the vaporizer 68, the gaseous nitrogen is transferred through conduit 76 to valves 64, 66 and 70, which are the door switch valve, the emergency-switch valve and the on-off switch valve, respectively. If any one of these valves is closed, as by opening the storage chamber door, the upstream side of the closed valve will be sealed and the downstream side will bleed to the atmosphere and prevent operation of the temperature-controller 62.

(3) If the valves in conduit 76 are open, the gaseous nitrogen will be transferred to the temperature-controller 62 through pressure regulator 63. If the storage chamber temperature sensing devices (not shown) of the temperature-controller 62 senses that the storage chamber is too warm, a pneumatic valve within the temperature-controller 62 will transfer the gaseous nitrogen through conduit 78 to pneumatically-operated liquid valve 60 which will open valve 60 and permit liquid nitrogen to flow through perforated conduit 36.

(4) When the storage chamber is cooled to the desired temperature, the pneumatic valve within the temperature-controller 62 will bleed the gaseous nitrogen previously supplied to valve 60 to the atmosphere thereby closing valve 60 and terminating the liquid nitrogen flow to the perforated conduit 36.

(5) If the vapor pressure in the liquid container exceeds a predetermined level, automatic vent valve 72 will open and transfer gaseous nitrogen to vent valve 124 thereby opening the latter to vent the liquid storage container. Manual valve 74 may be used in place of automatic valve 72, for example, to vent the liquid storage container during filling.

FIG. 3 also shows an arrangement for dispensing a vaporizable liquid such as liquid nitrogen wherein a plurality of liquid storage containers are arranged and interconnected in series relation such that the first container in the series is filled and substantially emptied before succeeding containers. This arrangement further provides that each succeeding container in the series is filled from and emptied through the preceding container. The first container in the series contains the filling and dispensing conduits for the system and the last container in the series contains the vapor vent for the system. In the invention, the bottom portion of each succeeding container in the series communicates with the top portion of the preceding container.

Vaporizable liquid is transferred into the first container of the series from a source thereof and, on filling such container, is then successively transferred through the first container into each succeeding container. After completion of the filling of the last container in the series, liquid transfer from the source is terminated. When demand on the system is made for liquid, liquid is dispensed from the first container of the series, the succeeding containers remaining substantially filled. As the first container is being emptied, liquid is transferred from the next container in the series to the first container and dispensed therefrom with the succeeding containers in the series remaining substantially filled. Thus, each succeeding container in the series is successively emptied through the first container in the order that each one is filled.

To illustrate the sequence of liquid withdrawal from the present system, four 210 liter containers were interconnected in series, each filled with 360 lbs. of liquid nitrogen, and then emptied. After about 1½ hours, the first container in the series was substantially completely emptied and the next (the second) container remained greater than 50% filled. After about 2½ hours, both the first and second containers were substantially completely emptied and the third container was greater than 50% filled. After about 3¼ hours, the first three containers were substantially completely emptied and the last (fourth) container in the series was greater than 50% filled. Finally, after about 5 hours all four containers were substantially completely emptied.

Referring specifically to the FIGURE 3 embodiment of the present invention, two containers 110 and 112, are shown interconnected in series relation in accordance with the above description, container 110 being shown partially filled as it might appear during emptying thereof. The first container 110 in the series is filled with a vaporizable liquid, such as liquid nitrogen, through conduit 114 from a liquid source (not shown) connected at 116, valve 118 controlling the flow of liquid thereinto. Any vapor evolved during the filling of container 110 is vented from the top portion of container 110 through conduit 120 into the bottom portion of the succeeding container 112 of the series. This vented vapor cools container 112 and is vented from the top portion thereof through conduit 122 either to another succeeding container or to the atmosphere if container 112 is the last in the series. Valve 124 in conduit 122 is open to permit vapor venting during filling and then closed on termination of the filling.

When container 110 is filled to a predetermined level as determined by the position of the end of conduit 120 therein, liquid is transferred from the top portion of container 110 through conduit 120 into the bottom portion of the succeeding container 112 in the series. On filling container 112, if such container is the last in the series, to a predetermined level as determined by the position of the end of conduit 122 therein, liquid transfer from the source is terminated by closing valve 118. Each of the containers in the series is preferably equipped with separate pressure relief devices such as safety valves, and bursting disks (which are set to maintain adequate pressure to allow dispensing of liquid from the containers).

During periods of no withdrawal, the pressure of the system will tend to reach the pressure of the lowest relief valve setting. If this lowest pressure relief valve was placed in the first container of the series, the succeeding containers would tend to empty into that container and discharge liquid through this relief valve. Therefore, this lowest pressure relief valve must be placed in the last container of the series to avoid wasteful discharge of the product liquid.

To dispense liquid from the system (valve 60 in withdrawal conduit 18 is opened and liquid flows from the first container 110. As the liquid level and pressure within container 110 are reduced, liquid will commence flowing from the bottom portion of container 112 through conduit 120 into the top portion of the preceding container 110.

The series arrangement shown in FIGURE 3 may be operated manually or electrically, by a circuit such as shown in FIG. 2, rather than pneumatically if desired.

Typical operations employing this invention might begin by precooling and then loading a retail frozen food delivery vehicle storage chamber at the beginning of the delivery day with the frozen foods to be distributed to various retail outlets surrounding the central warehouse. Upon closing the storage chamber off from the ambient atmosphere the control switch valve 70 is turned to the "run" position thereby putting the temperature controller circuit into operation. Because of the ability of the liquefied gas refrigeration system of this invention to cool the temperature of the storage chamber atmosphere to a very low temperature, the length of time for lowering the temperature of the storage chamber atmosphere from ambient temperature to, for example, about 0° F. is phenomenally less than for systems employing mechanical or solid $CO_2$ refrigeration being, for example, on the order of 1–1½ minutes for an insulated storage chamber of 430 to 540 cu. ft.

During loading of the storage chamber, the storage chamber atmospheric temperature will increase because of the ingress of warm ambient air. The prior art refrigerating systems cannot rechill the chamber atmosphere rapidly enough to avoid the damaging effects of heat transfer from the warm ambient air to the stored food products, but, for the reasons stated above, the present invention is not so limited.

As mentioned previously, mechanical and $CO_2$ refrigeration systems cannot prevent a 15°–20° F. rise in temperature of the foods during a multi-stop delivery schedule, and therefore the initial freezing of the foods prior to loading must lower the foods' temperature to —15° to 20° F. for delivery at, for example, 0° F. This is not a requirement for the liquefied-gas refrigeration system of the present invention and consequently a large savings in initial refrigeration costs is attained in addition to intransit refrigeration cost savings.

This system cools so quickly that many commercially available temperature sensing elements have lag factors such that the system overcools before the temperature controller can close the liquid phase valve. To overcome this problem, the temperature sensing element may be placed in a position such that liquid nitrogen is sprayed directly on to it thereby resulting in a more accurate control of the temperature of the storage chamber atmosphere. By these means or by using a temperature sensing device with a very small lag factor, the temperature of the storage chamber atmosphere can be controlled within a tolerance of ±2° F. over a very wide range of temperatures and brought to the operating temperature extremely quickly. A tolerance of about ±5° F., however, is satisfactory from the standpoint of efficient utilization of the refrigerant.

The embodiment of this invention described thus far is not only usable in retail delivery units with a mobile storage chamber in the 430–540 cu. ft. size class, but also in wholesale delivery units with a mobile storage chamber of a size on the order of 1600 cu. ft. A multiple header distributing system could be employed to insure adequate distribution of the liquefied nitrogen within the larger chamber, however a single perforated conduit such as is employed in the preferred embodiment would be entirely satisfactory.

Where employment of a delivery unit would require many stops with portions of the frozen food being removed at each stop, a false wall 58 located within the storage chamber is a most practical variation of the preferred embodiment. Such a wall is employed when a predetermined portion of the frozen food has been removed leaving part of the chamber empty. The false wall then encloses the remaining "filled" part of the storage chamber and, with the proper liquefied nitrogen distribution system, only that part of the chamber which is occupied need be refrigerated. To be effective, such a partition would necessarily be substantially as gas-tight as the storage chamber itself and be so constructed that when the storage chamber is completely full it would interfere neither with access into the chamber nor with the distribution of the liquefied nitrogen.

The inner partition, i.e. false-wall, may be fixed or movable. A fixed inner partition may, for example, comprise two doors that, upon being closed, subdivide the storage chamber into two equal volume, relatively gas-tight chambers. A movable inner partition may be positioned by a longitudinally oriented guide rail which allows the partition to be fixed in place anywhere along the rail's length. This partition may also consist of two doors that, upon being closed, form a relatively gas-tight wall.

The latter type of partition allows more judicious use of the refrigerant in that the ratio of frozen food volume to storage chamber volume is kept more constant than is possible with a fixed partition. If such an inner partition is employed, the refrigerant distributing system must be modified to avoid introducing the refrigerant into the empty portion of the storage chamber that is closed off by the partition. This is a desirable feature in that the refrigerant is employed most efficiently when little, or no, "unfilled" storage chamber volume need be cooled.

To illustrate the refrigerant savings attained by employing a false wall the following test was run: A storage chamber, 154″ x 78″ x 78,″ was provided with a movable partition and equipped with a 6′ long ½″ O.D. refrigerant distributing conduit with perforations oriented at 30° angles and staggered at 1′ intervals. The partition was equipped with rubber gaskets to further seal-off the refrigerated space. The refrigerating system was then subjected to liquid nitrogen consumption tests. The experimental procedure comprised maintaining the empty storage chamber atmosphere temperature at 0° F. while opening the storage chamber doors every one-half hour and keeping them open for a predetermined time period so as to expose the storage chamber atmosphere to ambient conditions. After the first one-half hour interval the movable partition, initially at the loading end of the storage chamber, was moved toward the opposite end of said chamber by six inches. During the remainder of each test run, the partition was moved in the same direction a distance of one foot at one-half hour intervals. The above procedure simulated the unloading of a storage chamber during a normal delivery schedule. The duration of each test run was about five hours. Liquid nitrogen was employed as the refrigeratnt, and its consumption during the tests was closely monitored. The following table summarizes the test results.

TABLE I.—OPERATION OF INTRANSIT REFRIGERATION SYSTEM

| Open-Door Period Each One-Half Hour | Liquid Nitrogen Consumption, lbs./hr. | |
| --- | --- | --- |
| | No Partition (lbs./hr.) | Movable Partition (lbs./hr.) |
| 8 minutes | 48 (84° F.) | 17 (45° F.). |
| 4 minutes | 38 (84° F.) | 23 (62° F.). |

In the above table the ambient temperature during each test run is indicated in parentheses. For the purposes of comparison it may be assumed that liquid nitrogen consumption increases linearly with the ambient temperature, all other conditions being equal, i.e., for tests employing an eight-minute open door period and no partition, the liquid nitrogen consumption adjusted to an ambient temperature of 45° F. would be 48 x (45–0)/(84–0) lbs./hr. or 25.7 lbs./hr. The above data indicate the decreased liquid nitrogen consumption obtainable with the use of a movable partition in the storage chamber.

It has been found that a single perforated, refrigerant distributing conduit about ½ as long as the storage chamber will adequately refrigerate the entire storage chamber volume. Therefore, if a partition is movable up to the point where the storage chamber is divided approximately in half, the advantages of having a movable partition may be combined with the consideration that little altering of the preferred distributing conduit is required to permit employment of the partition. Alternatively, the preferred distributing conduit may be provided with a shut-off valve mechanism that permits termination of the refrigerant flow through sections of the conduit. Using the above example, it is possible to arrange such a valve mechanism that would permit moving the partition in spaced intervals. After each position change, that section of the conduit no longer within the "filled" portion of the storage chamber could be closed off.

Figure 4:
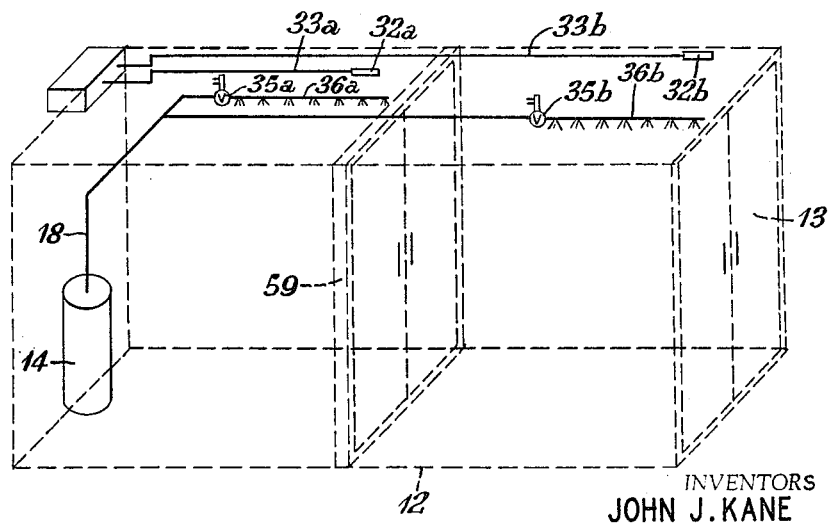

FIGURE 4 illustrates another embodiment of the present invention in conjunction with one or more partitions. This embodiment permits independent control of the temperature in each partitioned section of the storage chamber so that, for example, frozen foods could be stored in one section and fresh produce in another section. Also, the refrigeration to one section could be shut-off after that section is emptied without affecting the refrigeration in the other section. As shown in FIGURE 4, this embodiment provides separate perforated conduits such as 36a and 36b, and separate liquid dispensing control valves 35a and 35b for each section of the storage chamber, and separate temperature sensing elements 32a and 32b for each section. Consequently, each section becomes a separate unit, having temperature controlling means independent of the other sections, with the same source 14 of liquid nitrogen. This embodiment may be controlled electrically or pneumatically and may employ series-connected liquid storage containers if desired.

Although preferred embodiments of the invention have been described in detail, it is contemplated that modifications of the apparatus and process may be made and that some features may be employed without others, all within the spirit and scope of the invention.

What is claimed is:

1. A method for the intransit preservation of perishable products comprising the steps of providing pressurized low-boiling liquefied gas, having a boiling point at atmospheric pressure below about −80° C., and at a temperature corresponding to a vapor pressure above about 10 p.s.i.g. with the entire liquid and vapor substantially in equilibrium at the temperature of the liquid at all times, in a mobile thermally insulated storage container associated with a mobile thermally insulated storage chamber; controllably dispensing pressurized liquefied gas from the container by said vapor pressure and spraying such pressurized liquefied gas in liquid form at above atmospheric pressure into the storage chamber to cool and maintain the interior of such chamber thereby to a selected temperature range below ambient; exposing the interior of said storage chamber to the surrounding atmosphere and terminating such flow of liquefied gas from within said container.

2. A method according to claim 1 in which liquid nitrogen is said low-boiling liquefied gas.

3. A method for the intransit preservation of perishable products comprising the steps of introducing pressurized low boiling liquefied gas, having a boiling point at atmospheric pressure below −80° C., into a mobile thermally insulated storage container associated with a mobile thermally insulated storage chamber, the introducing pressure being such that the entire liquid and vapor in the container are substantially in equilibrium at the temperature of the liquid, and the vapor pressure being above about 10 p.s.i.g; storing the entire low-boiling liquefied gas at such temperature and pressure in the storage container; controllably dispensing pressurized liquefied gas from the container by said vapor pressure created therein at the time of liquid introduction, and spraying such liquefied gas in liquid form at above atmospheric pressure into the storage chamber to cool and maintain the interior of such chamber thereby to a selected temperature range below ambient; exposing the interior of said storage chamber to the surrounding atmosphere and terminating such flow of liquefied gas from said container.

4. A method for the intransit preservation of perishable products comprising the steps of providing pressurized low-boiling liquefied gas, having a boiling point at atmospheric pressure below about −80° C. and at temperature corresponding to a vapor pressure above about 10 p.s.i.g. in a mobile thermally insulated storage container associated with a mobile thermally insulated storage chamber; controllably dispensing pressurized liquefied gas from the container by said vapor pressure and spraying such pressurized liquefied gas in liquid form at above atmospheric pressure into the storage chamber to cool and maintain the interior of such chamber thereby to a selected temperature range below ambient, such dispensing and spraying being controlled by withdrawing a liquefied gas portion from the storage container, vaporizing such portion and using such vaporized portion to effect the pressurized liquefied gas dispensing and spraying in response to the storage chamber temperature; exposing the interior of said storage chamber to the surrounding atmosphere and terminating such flow of liquefied gas from said container.

5. In a system for the intransit preservation of perishable products, an apparatus comprising in combination, a mobile thermally insulated storage chamber for said perishable products; a mobile thermally insulated container associated with the storage chamber for storing pressurized low-boiling liquefied gas having a boiling point at atmospheric pressure below −80° C. and at temperature corresponding to a vapor pressure above about 10 p.s.i.g.; outlet means for substantially completely dispensing the contents of the storage container in a liquid form by said vapor pressure; conduit means connected to said outlet means being arranged and positioned within the upper portion of said storage chamber with openings for spraying of the dispensed liquefied gas in liquid form at above atmospheric pressure into the storage chamber to cool the interior of such chamber below ambient temperature; and liquefied gas flow control means comprising a temperature sensing element positioned within said storage chamber, a control valve operably interposed between the storage container outlet means and said conduit means and connected to the temperature sensing element to be responsive to the storage chamber temperature as sensed by said temperature sensing element, and an overriding means connected to said control valve for closing such valve.

6. Apparatus according to claim 5 in which an inner transverse partition is provided within the storage chamber for subdividing said storage chamber into two longitudinally adjacent sections, said inner partition being arranged and constructed with closable means communicating such sections.

7. Apparatus according to claim 5 in which an inner transverse partition is provided within the storage chamber for subdividing said storage chamber into two longitudinally adjacent sections, said inner partition being movably positioned along the longitudinal axis and constructed with closable means communicating such sections.

8. Apparatus according to claim 5 wherein said liquefied gas flow control means and said control valve are pneumatically operable, including a pneumatic liquid control circuit comprising vaporizer means communicating with said outlet means upstream of said control valve for receiving and vaporizing a constant supply of liquefied gas and communicating with said liquefied gas flow control means and said control valve in a manner such that said liquefied gas flow control means controls the transfer of the vaporized gas from said vaporizer means to said control valve in response to the temperature within said storage chamber to operate said control valve.

9. In a system for the intransit preservation of perishable products, an apparatus comprising in combination, a mobile thermally insulated storage chamber for said perishable products; a mobile thermally insulated low-boiling liquefied gas storage container associated with the storage chamber; means for introducing a pressurized low-boiling liquefied gas into said container having a boiling point at atmospheric pressure below −80° C. and at pressure such that the liquid and vapor in said container are substantially in equilibrium at the temperature of the liquid with the vapor pressure above about 10 p.s.i.g.; outlet means for substantially completely dispensing the contents of said container in a liquid form by said vapor pressure created therein at the time of filling said container; a perforated conduit connected to said outlet means being arranged and positioned within the upper portion of said storage chamber for spraying of the dispensed liquefied gas in liquid form at above atmospheric pressure into the storage chamber to cool the interior of such chamber below ambient temperature; liquefied gas flow control means comprising a temperature sensing element positioned within said storage chamber, a control valve operably interposed between the storage container outlet means and the perforated conduit and connected to the temperature sensing element to be responsive to the storage chamber temperature as sensed by said temperature sensing element, and an overriding means connected to said control valve for closing such valve.

10. Apparatus according to claim 9 wherein said perforator conduit contains a plurality of perforations alternately spaced on either side thereof; such perforations being directed outwardly from said perforated conduit at an angle between about 30°–60° from the downward perpendicular to the longitudinal axis of said perforated conduit.

11. Apparatus according to claim 9 wherein said temperature sensing element maintains the storage chamber temperature within a predetermined temperature range with a tolerance of +2° F.

12. In a system for the intransit preservation of perishable products, an apparatus comprising in combination, a mobile thermally insulated storage chamber for said perishable products; an inner transverse partition within such storage chamber for subdividing said storage chamber into two longitudinally adjacent sections, said inner partition being arranged and constructed with closable means communicating such sections; a mobile thermally insulated low-boiling liquefied gas storage container associated with the storage chamber and arranged for substantially completely dispensing its contents in a liquid form at above atmospheric pressure by vapor pressure created therein at the time of filling said container; means for introducing a pressurized low-boiling liquefied gas into said container having a boiling point at atmospheric pressure below −80° C. and at pressure such that the liquid and vapor in the container are substantially in equilibrium at the temperature of the liquid with the vapor pressure above about 10 p.s.i.g.; outlet means for dispensing said contents of said container; a first perforated conduit connected to said outlet means and extending into and positioned within the upper portion of one storage chamber section for spraying of said liquefied gas in liquid form at above atmospheric pressure therein; a second perforated conduit connected to said outlet means and extending into and positioned within the upper portion of the other storage chamber section for distribution of liquefied gas in liquid form therein at above atmospheric pressure; liquefied gas flow control means comprising first and second temperature sensing elements positioned respectively within the one and other storage chamber section, first and second control valves each operably interposed between the storage container outlet means and one of the perforated conduits and responsive to the temperature of respective storage chamber section as sensed by the respective temperature sensing element, and an overriding means connected to each control valve for closing such valve upon exposing the respective storage chamber section to ambient temperature.

13. Apparatus according to claim 12 wherein said inner partition is movable less than about one-half of the longitudinal length of said storage chamber; and said perforated conduit which is located within said other storage chamber section extends about one-half of the longitudinal length of said storage chamber.

References Cited by the Examiner
UNITED STATES PATENTS

| | | | |
|---|---|---|---|
| 2,447,249 | 8/1948 | Hill | 62—65 X |
| 2,479,821 | 8/1949 | Deutsch | 62—514 X |
| 2,479,840 | 8/1949 | Johnson | 62—514 X |
| 2,540,956 | 2/1951 | Morrison | 62—448 |
| 2,951,348 | 9/1960 | Loveday | 62—50 |

MEYER PERLIN, *Primary Examiner.*